United States Patent
vom Endt et al.

(10) Patent No.: US 12,449,493 B2
(45) Date of Patent: Oct. 21, 2025

(54) GRADIENT COIL UNIT FOR INTERVENTIONAL MR IMAGING

(71) Applicant: Siemens Healthineers AG, Forchheim (DE)

(72) Inventors: Axel vom Endt, Erlangen (DE); Simon Körber, Hallerndorf (DE)

(73) Assignee: Siemens Healthineers AG, Forchheim (DE)

( * ) Notice: Subject to any disclaimer, the term of this patent is extended or adjusted under 35 U.S.C. 154(b) by 116 days.

(21) Appl. No.: 18/237,432

(22) Filed: Aug. 24, 2023

(65) Prior Publication Data

US 2024/0069132 A1  Feb. 29, 2024

(30) Foreign Application Priority Data

Aug. 25, 2022  (EP) .................................... 22192179

(51) Int. Cl.
*G01R 33/385* (2006.01)
(52) U.S. Cl.
CPC .................. *G01R 33/385* (2013.01)
(58) Field of Classification Search
CPC ............... G01R 33/385; G01R 33/287; G01R 33/4215; G01R 33/3858
See application file for complete search history.

(56) References Cited

U.S. PATENT DOCUMENTS 4,733,189 A * 3/1988 Punchard ........... G01R 33/3875
                                                      324/318
4,794,338 A * 12/1988 Roemer ............. G01R 33/4215
                                                      324/318

(Continued)

FOREIGN PATENT DOCUMENTS

CN  106610479 A  *  5/2017  ............ A61B 5/055
EP  4152030 A1  3/2023

(Continued)

OTHER PUBLICATIONS

X. F. You, W. H. Yang, T. Song, H. X. Wang and Z. Wang, "Asymmetric Gradient Coil Design by Numerical Approach for MRI Brain Imaging," in IEEE Transactions on Applied Superconductivity, vol. 22, No. 3, pp. 4401904-4401904, Jun. 2012 (Year: 2012).*

(Continued)

*Primary Examiner* — Daniel R Miller
(74) *Attorney, Agent, or Firm* — Banner & Witcoff Ltd.

(57) ABSTRACT

A gradient coil unit surrounding a cylindrical patient receiving region and including a hollow cylindrical primary coil and a hollow cylindrical secondary coil surrounding the primary coil and the patient receiving region in a coaxial manner, having a first longitudinal end in a longitudinal direction, which is designed to receive an examination object, and a second longitudinal end lying opposite the first longitudinal end in the longitudinal direction, the primary coil having a first length in the longitudinal direction delimited by a first longitudinal position facing the first longitudinal end, and a second longitudinal position, the secondary coil having a second length delimited by a third longitudinal position facing the first longitudinal end, and a fourth longitudinal position, wherein the first length is shorter than the second length and the first longitudinal position has a greater spacing with respect to the first longitudinal end than the third longitudinal position.

11 Claims, 3 Drawing Sheets

(56) References Cited

U.S. PATENT DOCUMENTS

| | | | |
|---|---|---|---|
| 2002/0097052 A1* | 7/2002 | Minas | G01R 33/385 |
| | | | 324/318 |
| 2006/0033496 A1 | 2/2006 | Shvartsman et al. | |
| 2012/0074942 A1* | 3/2012 | Hollis | G01R 33/385 |
| | | | 324/318 |
| 2019/0331748 A1* | 10/2019 | Dietz | G01R 33/385 |
| 2021/0181279 A1* | 6/2021 | Dietz | G01R 33/385 |
| 2022/0011387 A1 | 1/2022 | Liu et al. | |
| 2023/0086830 A1 | 3/2023 | vom Endt et al. | |

FOREIGN PATENT DOCUMENTS

| | | |
|---|---|---|
| WO | 2004046745 A1 | 6/2004 |
| WO | 2020118352 A1 | 6/2020 |

OTHER PUBLICATIONS

Tang, Fangang et al: "A cone-shaped gradient coil design for high-resolution MRI head imaging", Physics in Medicine and Biology, Institute of Physics Publishing, Bristol GB, Bd. 64, Nr. 8, Apr. 5, 2019 (Apr. 5, 2019), p. 85003, XP020339372.

* cited by examiner

FIG 4

GRADIENT COIL UNIT FOR INTERVENTIONAL MR IMAGING

TECHNICAL FIELD

The invention relates to a gradient coil unit for interventional MR imaging and a magnetic resonance device.

BACKGROUND

In a magnetic resonance device, usually, the body of an examination object to be examined, particularly a patient, is exposed with the aid of a main magnet to a relatively high main magnetic field, for example, 1.5 or 3 tesla. As part of magnetic resonance imaging (MR imaging), gradient pulses are played out with the aid of a gradient coil unit. In addition, high-frequency radio frequency pulses (RF pulses), in particular, excitation pulses, are then transmitted via a radio frequency antenna unit using suitable antenna facilities, which leads to the fact that the nuclear spins of specific atoms that are excited in a resonant manner by these RF pulses are tilted about a defined flip angle relative to the magnetic field lines of the main magnetic field. When the nuclear spins relax, radio frequency signals, so-called magnetic resonance signals, are emitted that are received using suitable radio frequency antennas and then further processed. Finally, it is possible from the raw data acquired in this manner to reconstruct the desired image data.

A gradient coil unit conventionally comprises three primary coils and three secondary coils corresponding to the primary ones. The three primary coils are typically included in a primary coil unit. The three secondary coils are typically included in a secondary coil unit. A primary coil is typically designed to generate a magnetic field gradient in a spatial direction, particularly within a patient-receiving region. A magnetic field gradient is typically a magnetic field of a first order and/or linear order, in particular, a magnetic field, the amplitude of which increases in a linear manner along a spatial direction. Outside of the patient receiving region, the effect of a primary coil is suppressed to a large extent by a secondary coil allocated to the primary coil. The secondary coil typically surrounds the corresponding primary coil and is electrically connected in series to this primary coil. The magnetic field gradient and the main magnetic field typically only have a homogeneity required for the MR imaging within a part region of the patient receiving region, also known as the examination region. The examination region, in this case, is typically arranged centrally, in other words, in the middle, within the cylindrical patient receiving region, and as a consequence owing to the length of so-called closed magnetic resonance devices, is only reachable with difficulty from one end of the magnetic resonance device, for example by medical personnel. The size of the examination region can be, for example, 40 cm×40 cm×40 cm.

In the case of minimally invasive medical procedures, medical instruments, for example, a catheter and/or surgical needles, are inserted into a patient, wherein the procedure is usually monitored using imaging. The image monitoring renders it possible to record the images in which the medical instrument is made visible in relation to its anatomic environment. While classically, X-ray imaging has been used for the image monitoring of minimally invasive medical interventions, in particular, fluoroscopy; it has meanwhile been proposed to use magnetic resonance devices, therefore magnetic resonance imaging (MR imaging) for the image monitoring. This is typically referred to as interventional MR imaging.

A specific type of medical instrument that is frequently used for minimally invasive medical interventions is surgical needles that are used, for example, for biopsy, ablation, or brachytherapy. Also, it has already been proposed to propagate these under magnetic resonance real-time control in relation to surgical needles. Conventionally, minimally invasive medical interventions of this type are performed step by step, wherein the surgical needle is placed on the examination object outside of the examination region of the magnetic resonance device. Subsequently, the examination object is positioned using a patient positioning apparatus within the patient receiving region so that the surgical needle is positioned in the examination region, and the position and/or location of the surgical needle can be monitored using MR imaging. The doctor performs the invasive process again in the starting position outside of the examination region. Further checks are typically required with repeated positioning of the examination object within the examination region.

SUMMARY

An object of the disclosure is to disclose a gradient coil unit that is particularly well suited for interventional MR imaging.

The gradient coil unit, in accordance with the disclosure, surrounds a cylindrical patient receiving region and comprises a hollow cylindrical primary coil and a hollow cylindrical secondary coil that surrounds the primary coil and the patient receiving region in a coaxial and/or concentric manner. The gradient coil unit has a first longitudinal end in a longitudinal direction, which first longitudinal end is designed to receive an examination object. The gradient coil unit has a second longitudinal end that lies opposite the first longitudinal end in the longitudinal direction. The primary coil has a first length in the longitudinal direction, which is delimited by a first longitudinal position facing the first longitudinal end, and a second longitudinal position facing the second longitudinal end. The secondary coil has a second length in the longitudinal direction, delimited by a third longitudinal position facing the first longitudinal end, and a fourth longitudinal position facing the second longitudinal end. The first longitudinal position has a greater spacing with respect to the first longitudinal end than the third longitudinal position. The first length is preferably shorter than the second length.

The gradient coil unit is accordingly designed as hollow cylindrical and surrounds at least in part the patient receiving region. The gradient coil unit is preferably designed as a whole-body coil with the result that the patient receiving region can entirely receive and/or encompass, for example, an abdomen and/or a shoulder region of the examination object in the circumferential direction. The cylinder axis of the gradient coil unit can be referred to as a longitudinal axis and/or z-axis and is typically oriented horizontally and/or parallel to the longitudinal direction. The primary coil is preferably designed to generate a magnetic field gradient in a spatial direction. The secondary coil is preferably designed to shield the magnetic field gradient generated by the primary coil in the region of the gradient coil unit, which is remote from the patient receiving region. The first longitudinal end of the gradient coil unit is typically arranged on the side of the examination region on which an examination object can be introduced into the examination region using a patient positioning apparatus. The second longitudinal end of the gradient coil unit typically corresponds to the side of the gradient coil unit on which the connection cables of the gradient coil unit are provided. The second longitudinal end is typically remote from the first longitudinal end in the longitudinal direction. The first length and the second length relate typically to lines that extend parallel, in particular, in the longitudinal direction, between the first longitudinal end and the second longitudinal end. The second longitudinal position can correspond to the fourth longitudinal position. The second longitudinal position and/or the fourth longitudinal position are typically remote from the first longitudinal end. The primary and secondary coils can be designed as flush on the second longitudinal end. A longitudinal position is typically a coordinate of the longitudinal axis, particularly a coordinate of the z-axis.

The gradient coil unit, in accordance with the disclosure, is accordingly designed in such a manner that the primary coil, which is arranged on the side of the gradient coil unit that is facing the patient receiving region, is smaller than the secondary coil. The shorter first length of the primary coil means, in particular, that a greater inner diameter of the patient receiving region can be realized on the first longitudinal end. This facilitates access for the medical personnel to the examination region from outside the gradient coil unit and thus renders interventional MR imaging possible in a particularly effective manner.

One aspect of the gradient coil unit comprises a casing that at least in part encompasses the gradient coil unit and is designed as funnel-shaped on the first longitudinal end. A casing can be designed as a housing and/or shell and/or enclosure for the primary coil and the secondary coil. The gradient coil unit has on the first longitudinal end preferably a funnel-shaped opening, which renders it possible for the medical personnel to access the examination region particularly effectively even from outside the gradient coil unit. In particular, the medical personnel can turn their upper body and/or shoulder region towards the opening, which particularly effectively renders possible interventional MR imaging within the patient receiving region.

One aspect of the gradient coil unit provides that the first and third longitudinal positions differ by at least 3 cm, preferably by at least 4 cm, and preferably by at least 6 cm. The first longitudinal position has a spacing with respect to an isocenter of the gradient coil unit, which is at least 3 cm smaller than the third longitudinal position. The spacing of the first longitudinal position with respect to the isocenter of the gradient coil unit is typically smaller than the spacing of the second longitudinal position with respect to the isocenter of the gradient coil unit.

The spacing of the first longitudinal position with respect to the isocenter of the gradient coil unit is typically between 500 mm and 700 mm, preferably between 580 mm and 620 mm, particularly preferably between 590 mm and 610 mm. The spacing of the second longitudinal position with respect to the isocenter of the gradient coil unit is typically between 620 mm and 750 mm, preferably between 650 mm and 710 mm, particularly preferably between 670 mm and 690 mm. The spacing of the third longitudinal position with respect to the isocenter of the gradient coil unit typically differs by less than 2 cm, preferably by less than 1 cm, particularly preferably by less than 0.5 cm from the spacing of the second longitudinal position with respect to the isocenter of the gradient coil unit. The first length is typically between 1100 mm and 1400 mm, preferably between 1200 mm and 1300 mm, particularly preferably between 1235 mm and 1265 mm. The second length is typically between 1200 mm and 1400 mm, preferably between 1250 mm and 1350 mm, particularly preferably between 1285 mm and 1315 mm. The spacing of the second longitudinal position with respect to the isocenter of the gradient coil unit is typically between 600 mm and 700 mm, preferably between 620 mm and 680 mm, particularly preferably between 640 mm and 660 mm.

This aspect renders possible a funnel-shaped opening at the first longitudinal end and improved accessibility of the examination region with a compact construction at the same time.

One aspect of the gradient coil unit provides that the second longitudinal position and the fourth longitudinal position differ by at most 4 cm, preferably by at most 2 cm, particularly preferably by at most 1 cm. The secondary and primary coils can also terminate flush at the second longitudinal end. This renders possible a particularly compact construction of the gradient coil unit.

One aspect of the gradient coil unit provides that the gradient coil unit has an inner diameter of at least 840 mm and a spatial extent in the longitudinal direction of at most 1350 mm. The inner diameter typically relates to the cylinder's diameter surrounding the primary coil and/or the casing. The inner diameter of the gradient coil unit in accordance with this aspect is at least 840 mm, preferably at least 855 mm, particularly preferably at least 865 mm. The spatial extent of the gradient coil unit in the longitudinal direction can correspond to the second length and/or be greater than this second length. The length of the gradient coil unit in the longitudinal direction in accordance with this aspect is less than 1350 mm, preferably less than 1340 mm, particularly preferably less than 1328 mm.

This aspect renders possible an examination region having a diameter of 800 mm and a spacing of the funnel entrance from the isocenter and/or from the examination region of less than 600 mm. This geometry makes possible a particularly simple and monitored use of surgical needles within the patient receiving region.

One aspect of the gradient coil unit provides that the gradient coil unit can be divided and/or organized into four quadrants; the primary coil comprises four helical primary conductor structures that are arranged in each case within a quadrant surrounding a respective primary fix point and the secondary coil comprises four helical secondary conductor structures that are arranged in each case within a quadrant surrounding a respective secondary fix point. Moreover, this aspect of the gradient coil unit provides a first section of the primary coil that is delimited in the longitudinal direction by the first longitudinal position and by a further primary longitudinal position at a spacing of at most 25% of the first length with respect to the first longitudinal position, preferably at a spacing between 10% and 25% of the first length with respect to the first longitudinal position, and is not provided with a connecting conductor that connects two primary conductor structures to one another and/or a primary conductor structure to a secondary conductor structure.

The gradient coil unit can typically be divided into four quadrants and/or the gradient coil unit comprises four quadrants, wherein these four quadrants typically only define four disjoint geometric regions of the gradient coil unit. The four quadrants typically denote regions of the gradient coil unit, wherein a transition between two quadrants in each case is not provided with a physical and/or visible division. The primary conductor structure is preferably part of the primary coil, which typically comprises the primary conductor structure four times, arranged in each case in one of the four quadrants, and the primary coil is designed to generate a magnetic field gradient in a spatial direction. As described below, a conductor structure can be designed as a primary or a secondary conductor structure. The conductor structure typically comprises a geometric arrangement of an electrical conductor. The conductor structure is typically arranged on a cylinder and is designed as saddle-shaped. The conductor structure is spatially typically delimited by a quadrant of the gradient coil unit. The conductor structure is preferably formed at least in a helical manner having windings with different radii relative to a fixed point. A primary conductor structure typically surrounds a primary fix point at least in part in a helical manner, and/or a secondary conductor structure typically surrounds a secondary fix point at least in part in a helical manner.

The four primary conductor structures and the four secondary conductor structures are typically electrically connected to one another in series. Electrical conductors connecting two primary conductor structures of different quadrants or connecting two secondary conductor structures of different quadrants, or connecting a primary conductor structure and a secondary conductor structure can be referred to as connecting conductors. Connecting conductors can be designed as primary or secondary connecting conductors. Primary connecting conductors typically connect two primary conductor structures of two different quadrants or a primary conductor structure to a secondary conductor structure. Secondary connecting conductors typically connect two secondary conductor structures of two different quadrants. A connecting conductor typically represents an electrical connection between two quadrants and/or between a primary and secondary coil. A connecting conductor is typically predominantly designed as straight, in particular, not designed as helical.

The first section of the gradient coil unit, in accordance with this aspect, is not provided with a connecting conductor and consequently comprises preferably exclusively electrical conductors that are part of a primary conductor structure and actively contribute to generating a magnetic field gradient. The first section can accordingly be used in a particularly spatially efficient manner for generating the magnetic field gradient since, typically, all the connectors and technically required connections are arranged outside of the first section. Connecting conductors in accordance with this aspect are arranged outside of the first section and/or, in particular, near the second longitudinal end, whereby these connecting conductors influence the homogeneity of the examination region and the magnetic field gradient at the first longitudinal end to a lesser extent. Moreover, the density of the electrical conductor that the conductor structures comprise, in particular, the primary conductor structures, in the region outside of the first section and/or, in particular, near the second longitudinal end is lower than in the first section whereby the primary coil in this region has sufficient space for receiving the connecting conductor. The electrical conductors within the first section can accordingly be optimized without considering connecting conductors with regard to the ideal homogeneity of the magnetic field gradient near the first longitudinal end. The first section typically adjoins the first longitudinal end, whereby the examination region, particularly the region of high homogeneity of the magnetic field gradients, can be generated particularly close to the first longitudinal end. This renders possible particularly effective access for the medical personnel to the examination region and, consequently, interventional MR imaging that is particularly easy to perform.

One aspect of the gradient coil unit provides that the primary conductor structures, in particular the primary conductor structures, which are arranged within a quadrant that overlaps with the first section, have in each case the highest density of electrical conductors within the first section. The corresponding primary conductor structures are accordingly designed so that the maximum density of the electrical conductor of the corresponding primary conductor structure is present within at least a part region of the first section. The part region typically comprises at least 10%, preferably at least 15%, particularly preferably at least 20% of the first section. In particular, a primary conductor structure, arranged within a quadrant that adjoins the first longitudinal end, is designed in such a manner that the highest current density of the primary coil can be generated in the first section. In accordance with this aspect, the primary conductor structures that are facing the first longitudinal end in the longitudinal direction in the first section provide a particularly small spacing between adjacent windings of the electrical conductor of the primary conductor structures. This renders possible a particularly high current density at the first longitudinal end averaged in the longitudinal direction over the first section at at least one position in the circumferential direction. The density of an electrical conductor can be determined by the number of the electrical conductors per cross-sectional area of the primary coil perpendicular to the electrical conductor and/or the sum of the area of the conductor cross-sections per cross-sectional area of the primary coil perpendicular to the electrical conductor. The higher the density of the electrical conductors that are arranged in a helical manner with the commutated current direction, in particular, the smaller the spacing between adjacent windings, such as in the case of a primary conductor structure within a quadrant, the higher the electrical current density in this region. This renders possible a particularly high current density within the first section, which in particular leads to the fact that the region within the patient receiving region having the highest homogeneity of the magnetic field gradients, therefore the examination region, is closer to the first longitudinal end than the second longitudinal end. Consequently, the examination region is particularly easily accessible from the first longitudinal end for interventional examinations. Moreover, the gradient coil unit can be designed as particularly short in the longitudinal direction compared to conventional gradient coil units.

One aspect of the gradient coil unit comprises a primary connecting conductor, which connects two primary conductor structures to one another and/or a primary conductor structure to a secondary conductor structure and which connects to a winding of the primary conductor structure, which is closest to the at least one primary fix point. The primary connecting conductor, in accordance with this aspect connects an eye of a primary conductor structure to a further primary conductor structure or secondary conductor structure. This renders it possible to design, in particular, the first section without a connecting conductor, in particular, a primary connecting conductor, since the connecting conductor can lead from the primary fix point to the second longitudinal end.

One aspect of the gradient coil unit provides that a second section of the secondary coil that is delimited in the longitudinal direction by the third longitudinal position and by a further secondary longitudinal position at a spacing of at most 25% of the second length with respect to the third longitudinal position, preferably at a spacing between 10% and 25% of the second length with respect to the third longitudinal position, and is not provided with a secondary connecting conductor that connects two secondary conductor structures to one another and/or a primary conductor structure to a secondary conductor structure. The first and second sections intersect, at least in part, in the longitudinal and circumferential directions. This aspect provides a construction of the secondary coil similar to the primary coil.

This renders possible an efficient shielding of the primary coil that provides a first section without a connecting conductor. The advantages of a primary coil of this type can be transferred to this aspect.

One aspect of the gradient coil unit provides that the secondary conductor structures, in particular the secondary conductor structures, which are arranged within a quadrant that overlaps with the second section, have in each case the highest density of electrical conductors within the second section. The corresponding secondary conductor structures are accordingly designed so that the maximum density of the electrical conductor of the corresponding secondary conductor structure is present within at least a part region of the second section. The part region typically comprises at least 10%, preferably at least 15%, particularly preferably at least 20% of the second section. In particular, a secondary conductor structure, arranged within a quadrant that adjoins the first longitudinal end, is designed in such a manner that the highest current density of the primary coil can be generated in the second section.

In accordance with this aspect, the secondary conductor structures facing the first longitudinal end in the longitudinal direction in the first section provide a particularly small spacing between adjacent windings of the electrical conductor of the secondary conductor structures. This renders possible a particularly high current density at the first longitudinal end averaged in the longitudinal direction over the second section at at least one position in the circumferential direction. The density of an electrical conductor can be determined by the number of the electrical conductors per cross-sectional area of the secondary coil perpendicular to the electrical conductor and/or the sum of the area of the conductor cross-sections per cross-sectional area of the secondary coil perpendicular to the electrical conductor. This renders possible a particularly high current density within the second section, which in particular leads to the fact that a magnetic field gradient generated by the primary coil can be particularly effectively shielded. Moreover, the gradient coil unit can be designed as particularly short in the longitudinal direction compared to conventional gradient coil units.

One aspect of the gradient coil unit comprises a secondary connecting conductor, which connects two secondary conductor structures to one another and/or a primary conductor structure to a secondary conductor structure and which connects to a winding of the secondary conductor structure, which is closest to the at least one secondary fix point. In accordance with this aspect, the secondary connecting conductor connects an eye of a secondary conductor structure to a further secondary or primary conductor structure. This renders it possible to design, in particular, the second section without a connecting conductor, in particular, a secondary connecting conductor, since the connecting conductor can lead from the secondary fix point to the second longitudinal end.

Furthermore, the disclosure is based on a magnetic resonance device comprising a detector unit having a main magnet, a radio frequency antenna unit, and a gradient coil unit in accordance with the disclosure, wherein the gradient coil unit surrounds the radio frequency antenna unit in a coaxial and/or concentric manner. The magnetic resonance device also comprises a control unit designed to control the detector unit. The spatial extent of the radio frequency antenna unit is shorter in the longitudinal direction than the second length. The detector unit accordingly comprises the main magnet, the gradient coil unit in accordance with the disclosure, and the radio frequency antenna unit. The secondary coil has a longer spatial extent than the radio frequency antenna unit. The radio frequency antenna unit is typically arranged within the gradient coil unit. The length of the radio frequency antenna unit in the longitudinal direction can also be shorter than the first length.

The length of the radio frequency antenna unit in the longitudinal direction is typically delimited by a seventh longitudinal position facing the first longitudinal end and an eighth longitudinal position. The seventh longitudinal position can have a smaller spacing with respect to an isocenter of the gradient coil unit than the first longitudinal position and/or the third longitudinal position.

The eighth longitudinal position can have a smaller spacing with respect to an isocenter of the gradient coil unit than the second longitudinal position and/or the fourth longitudinal position. This prevents a spatial limitation of the opening of the gradient coil unit in accordance with the disclosure at the first longitudinal end by the radio frequency antenna unit and accordingly renders possible effective access to the examination region. Aspects of the magnetic resonance device in accordance with the disclosure are designed similarly to the aspects of the gradient coil unit in accordance with the disclosure. The advantages of the magnetic resonance device in accordance with the disclosure correspond essentially to the advantages of the gradient coil unit in accordance with the disclosure stated in detail above. In this case, mentioned features, advantages, or alternative aspects can also be transferred to the other claimed subjects and vice versa.

BRIEF DESCRIPTION OF THE DRAWINGS

Further advantages, features, and details of the disclosure are evident in the following described exemplary aspects and also with the aid of the drawings.

In the drawings.

DETAILED DESCRIPTION

Figure 1:
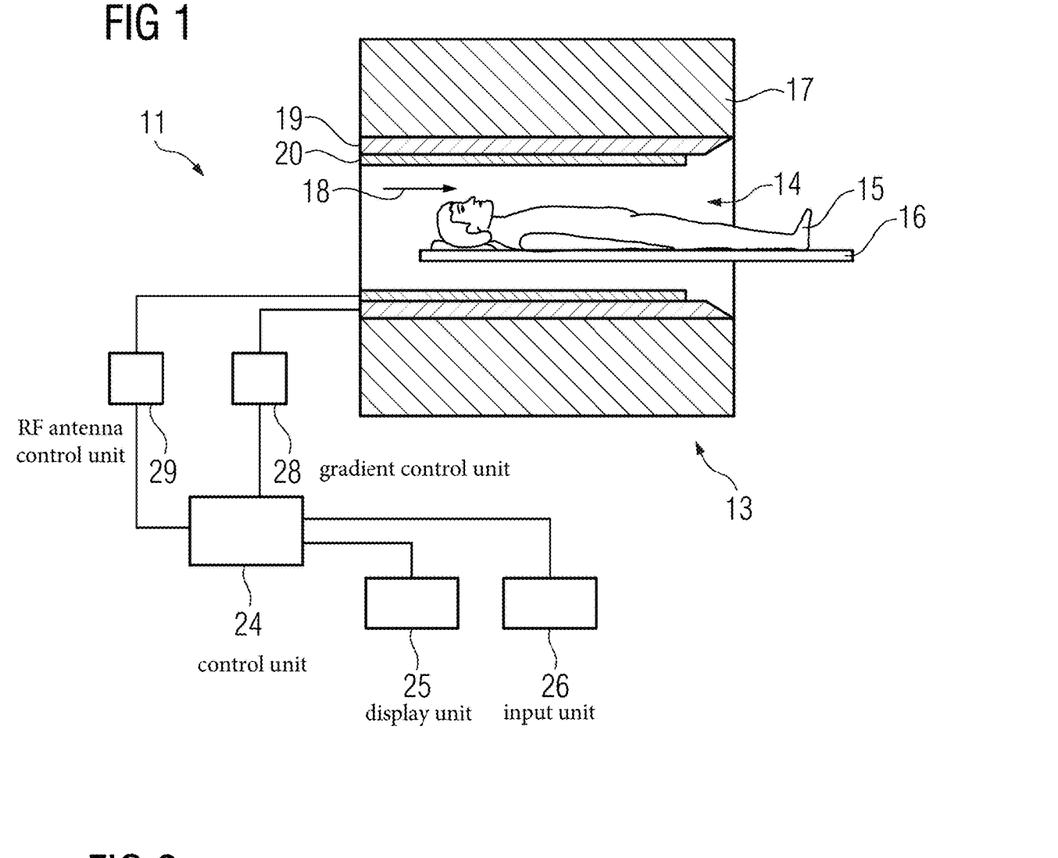
FIG. 1 shows a magnetic resonance device in accordance with the disclosure in a schematic illustration.

FIG. 1 illustrates a magnetic resonance device 11 in accordance with the disclosure. The magnetic resonance device 11 comprises a detector unit 13 having a main magnet 17 for generating an intense and, in particular constant main magnetic field 18. Moreover, the magnetic resonance device 11 has a cylindrical patient receiving region 14 for receiving a patient 15, wherein the patient receiving region 14 is encompassed in a cylindrical manner in a circumferential direction by the detector unit 13. The patient 15 can be pushed using a patient positioning apparatus 16 of the magnetic resonance device 11 into the patient receiving region 14. The patient positioning apparatus 16 for this purpose has a patient couch arranged in a movable manner within the magnetic resonance device 11. The detector unit 13 furthermore has a radio frequency antenna unit 20 that, in the illustrated case, is designed as a body coil that is fixedly integrated into the magnetic resonance device 11, and a radio frequency antenna control unit 29 for exciting a polarization, which is set in the magnetic field 18 that is generated by the main magnet 17. The radio frequency antenna unit 20 is controlled by the radio frequency antenna control unit 29. It emits radio frequency pulses into an examination space essentially formed by the patient receiving region 14.

Furthermore, the detector unit 13 has a gradient coil unit 19 in accordance with the disclosure that is used for location encoding during imaging. The gradient coil unit 19 is controlled using a gradient coil unit 28. The gradient coil unit 19, in this case, comprises a hollow cylindrical secondary coil 40 that surrounds a primary coil 30 in a coaxial manner, wherein the secondary coil 40 has a second length parallel to the main magnetic field 18, which is longer than the first length of the primary coil 30 parallel to the main magnetic field 18. The main magnetic field 18 is preferably oriented in the longitudinal direction. The radio frequency antenna unit 20 has a length in the longitudinal direction that is shorter than the second length.

For control of the main magnet 17, the gradient control unit 28, and the radio frequency antenna control unit 29, the magnetic resonance device 11 has a control unit 24. The control unit 24 centrally controls the magnetic resonance device 11, such as implementing MR control sequences. The magnetic resonance device 11 has a display unit 25. Moreover, the magnetic resonance device 11 has an input unit 26, using which information and/or control parameters can be input by a user during a measuring procedure. The control unit 24 can comprise the gradient control unit 28 and/or radio frequency antenna control unit 29 and/or the display unit 25, and/or the input unit 26.

The illustrated magnetic resonance device 11 can comprise further components that magnetic resonance devices 11 usually have. A general function of a magnetic resonance device 11 is known to the person skilled in the art, so a detailed description of the further components is omitted.

Figure 2:
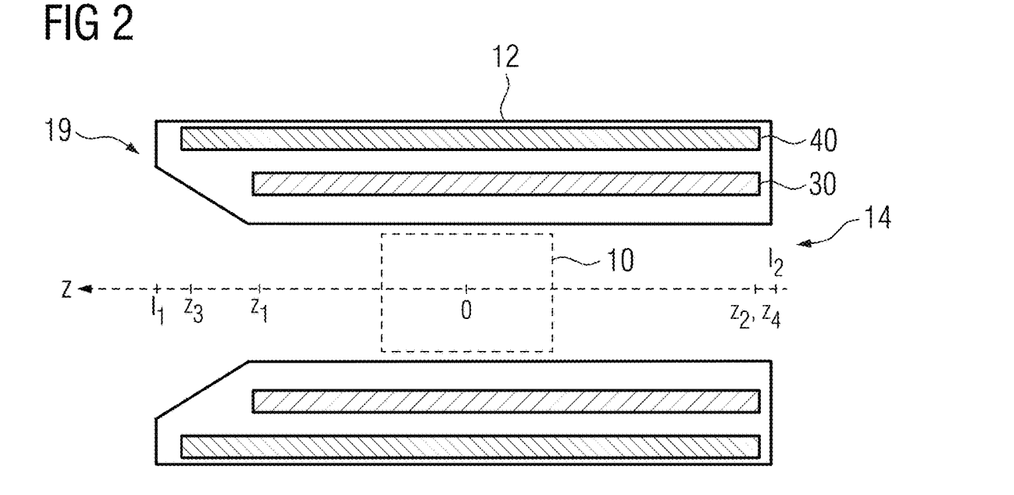
FIG. 2 shows an aspect of a gradient coil unit in accordance with the disclosure in a first view in a schematic illustration.

FIG. 2 illustrates an aspect of a gradient coil unit 19 in accordance with the disclosure in a first view in a schematic illustration. The gradient coil unit 19 comprises a hollow cylindrical primary coil 30 and a hollow cylindrical secondary coil 40 that surrounds the primary coil 30 and the patient receiving region 14 in a coaxial manner. In this case, the secondary coil 40 typically has a greater radius, in particular, a greater spacing from the z-axis than the primary coil 30. The gradient coil unit 19 is delimited in the longitudinal direction z by a first longitudinal end 11 and a second longitudinal end 12 that lies opposite the first longitudinal end 11 in the longitudinal direction z. In this case, the first longitudinal end 11 of the gradient coil unit 19 is designed to receive an examination object, particularly a patient 15. The primary coil 30 has a first length in the longitudinal direction z that is delimited by a first longitudinal position z1 facing the first longitudinal end 11, and a second longitudinal position z2 remote in the longitudinal direction z. The secondary coil 40 has a second length delimited by a third longitudinal position z3 facing the first longitudinal end 11, and a fourth longitudinal position z4. The first length is shorter than the second length, and the first longitudinal position z1 has a greater spacing with respect to the first longitudinal end 11 than the third longitudinal position z3 with respect to the first longitudinal end 11. The gradient coil unit 19 also comprises a casing 12 that at least partially encompasses the gradient coil unit 19 and is designed as funnel-shaped on the first longitudinal end 11. In particular, the casing 12 has a tapering starting from the first longitudinal position z1 to the first longitudinal end 11 perpendicular to the longitudinal direction z. The isocenter 0 of the gradient coil unit 19 is typically the spatial center point of the outer cylinder and/or the inner cylinder and/or the examination region 10. The examination region 10 is a part region of the patient receiving region 14.

Figure 3:
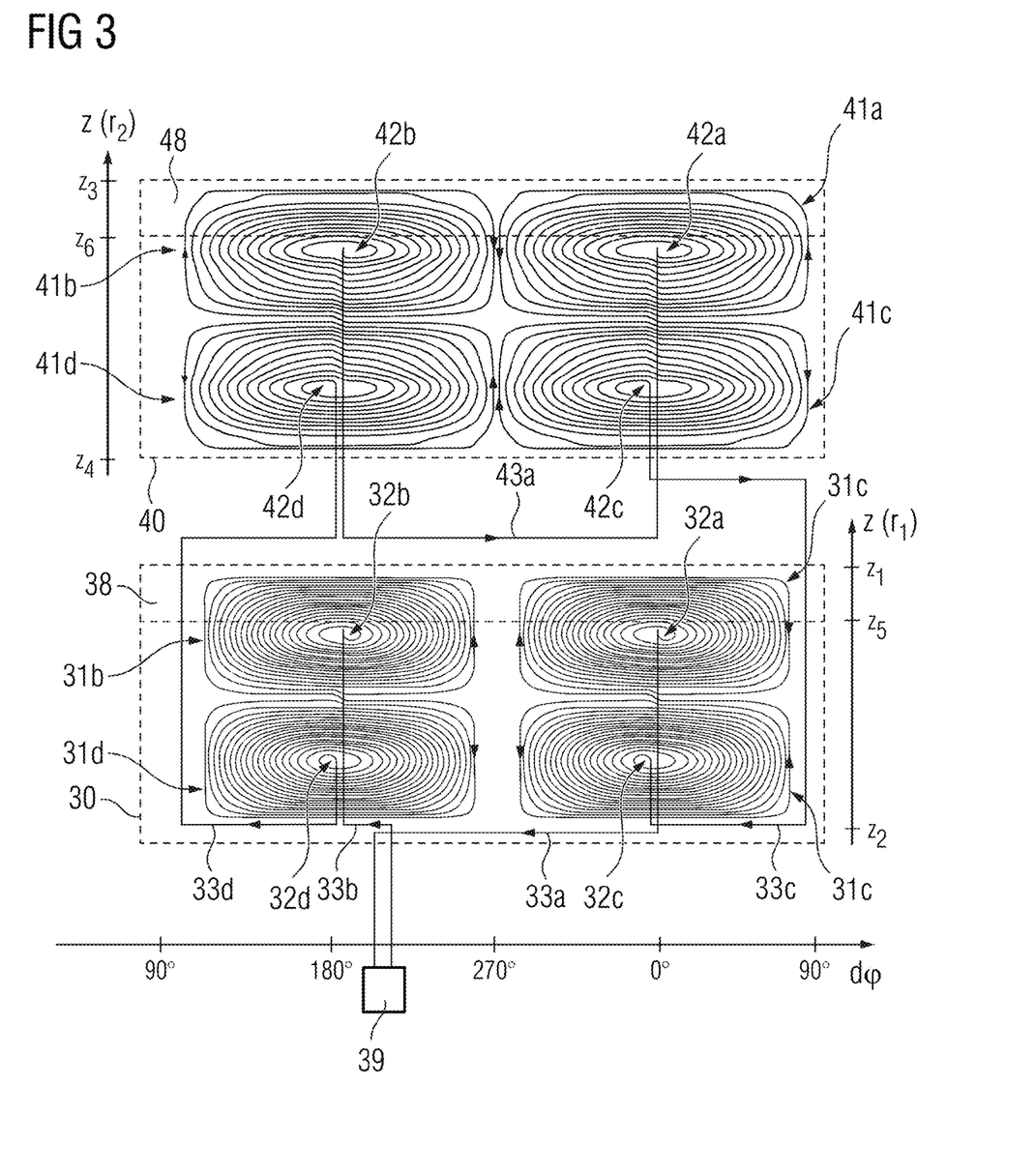
FIG. 3 shows an aspect of a gradient coil unit in accordance with the disclosure in a second view.

FIG. 3 illustrates an aspect of a gradient coil unit 19 in accordance with the disclosure in a second view. In this case, the primary coil 30 and the secondary coil 40 are illustrated respectively in an unrolled form. The coordinates of the circumferential direction d$\phi$ apply for the primary coil 30 and the secondary coil 40. In each case, separate axes, which overlap at least in part, are indicated for the primary coil 30 and the secondary coil 40. As is illustrated, for example, in FIG. 2, the second longitudinal position z2 can correspond to the fourth longitudinal position z4. The primary coil 30 and the secondary coil 40 differ from one another in their radial spacing r with respect to the longitudinal direction z. The primary coil 30 has a first radius r1 with respect to the longitudinal direction z, and the secondary coil 40 has a second radius r2 with respect to the longitudinal direction z, wherein the second radius r2 is greater than the first radius r1.

The primary coil 30, illustrated in FIG. 3 is preferably designed to generate a magnetic field gradient in the x-direction. The gradient coil unit 19 can be divided into four quadrants that differ in pairs due to their position in the longitudinal direction z or by their position in the circumferential direction d$\phi$. A quadrant is defined for example by z=[0; l1] and d$\phi$=[90°; 270°] and an opposite-lying quadrant is defined by z=[l2; 0] and d$\phi$=[270°; 90°]. The primary coil 30 comprises four helical primary conductor structures 31*a*, 31*b*, 31*c*, 31*d* that are arranged in each case within a quadrant. One of the four helical primary conductor structures 31*a*, 31*b*, 31*c*, 31*d* in this case respectively surrounds at least in part in a helical manner a primary fix point 32*a*, 32*b*, 32*c*, 32*d*, wherein in each case one of the four primary fix points 32*a*, 32*b*, 32*c*, 32*d* is respectively arranged in a quadrant. The secondary coil 40 comprises four helical secondary conductor structures 41*a*, 41*b*, 41*c*, 41*d* that are arranged in each case within a quadrant. One of the four helical secondary conductor structures 41*a*, 41*b*, 41*c*, 41*d* in this case respectively surrounds at least in a helical manner a secondary fix point 42*a*, 42*b*, 42*c*, 42*d*, wherein in each case one of the four secondary fix points 42*a*, 42*b*, 42*c*, 42*d* is respectively arranged in a quadrant.

A first section 38 of the primary coil 30 is delimited in the longitudinal direction z by the first longitudinal position z1 and by a further primary longitudinal position z5, wherein the spacing of the further primary longitudinal position z5 with respect to the first longitudinal position z1 is at most 25%, preferably between 10% and 25% of the first length. The first section 38 is not provided with a connecting conductor 33, 43, which connects two primary conductor structures 31*a*, 31*b*, 31*c*, 31*d* to one another and/or a primary conductor structure 31*a*, 31*b*, 31*c*, 31*d* to a secondary conductor structure 41*a*, 41*b*, 41*c*, 41*d*. Connecting conductors 33, 43 are illustrated schematically in FIG. 3 by straight lines.

Moreover, the primary conductor structures 31*a*, 31*b* that are arranged within the quadrants that adjoin the first longitudinal end are designed in such a manner that the highest current density of the primary coil 30 can be generated in the first section 38 and/or the primary conductor structures 31*a*, 31*b* within the first section 38 have the highest density of electrical conductors. The primary coil 30 and, in particular, the primary conductor structures 31*a*, 31*b*, 31*c*, 31*d* that are included in the primary coil 30 are accordingly designed in such a manner that the highest current density of the primary coil 30 can be generated and/or the highest density of electrical conductors of the primary coil 30 is present within the first section 38, in particular within a part region of the first section 38.

The gradient coil unit 19 comprises primary connecting conductors 33a, 33b, 33c, 33d, which connect in each case two primary conductor structures 31a, 31b, 31c, 31d to one another and/or a primary conductor structure 31a, 31b, 31c, 31d to a secondary conductor structure 41a, 41b, 41c, 41d. A primary connecting conductor 33a, 33b, 33c, 33d in this case, adjoins a winding of the primary conductor structure 31a, 31b, 31c, 31d that is closest to the corresponding primary fix point 32a, 32b, 32c, 32d.

A second section 48 of the secondary coil 40 is delimited in the longitudinal direction z by the third longitudinal position z3 and by a further secondary longitudinal position z6, wherein the spacing of the further secondary longitudinal position z6 with respect to the third longitudinal position z3 is at most 25%, preferably between 10% and 25% of the second length. The second section 48 is provided without a connecting conductor 33, 43, and in particular without a secondary connecting conductor 43a, which connects two secondary conductor structures 41a, 41b, 41c, 41d to one another. A connecting conductor 33, 43 can be designed as a primary connecting conductor 33a, 33b, 33c, 33d, and/or secondary connecting conductor 43a.

Moreover, the secondary conductor structures 41a, 41b that are arranged within the quadrants that adjoin the first longitudinal end 11 are designed in such a manner that the highest current density of the secondary coil 40 can be generated in the second section 48 and/or the secondary conductor structures 41a, 41b within the second section 48 have the highest density of electrical conductors. The secondary coil 40 and, in particular, the secondary conductor structures 41a, 41b, 41c, 41d that are included in the secondary coil 40 are accordingly designed in such a manner that the highest current density of the secondary coil 40 can be generated and/or the highest density of electrical conductors of the secondary coil 40 is present within the second section 48, in particular, within a part region of the second section 48.

The gradient coil unit 19 and, in particular, the secondary coil 40 comprise a secondary connecting conductor 43a that connects two secondary conductor structures 41a, 41b to one another and connects to, in each case, a winding of the secondary conductor structures 41a, 41b, which is closest to the secondary fix points 42a, 42b. Further secondary conductor structures 41c, 41d can each be serially connected by a primary connecting conductor 33c, 33d to a respective primary conductor structure 31c, 31d. It is preferred that all the primary conductor structures 31a, 31b, 31c, 31d and secondary conductor structures 41a, 41b, 41c, 41d are connected in series, wherein an electrical voltage is generated by a gradient amplifier unit 39. The gradient amplifier unit 39 is preferably designed as part of the gradient control unit 28.

The gradient coil unit 19 preferably comprises the primary conductor structures 31a, 31b, 31c, 31d and secondary conductor structures 41a, 41b, 41c, 41d that are illustrated in FIG. 3 again, however, rotated in the circumferential direction dϕ by 90', and the primary and secondary conductor structures are designed to generate a magnetic field gradient in the y-direction, in particular, due to being controlled by a further gradient amplifier unit.

Figure 4:
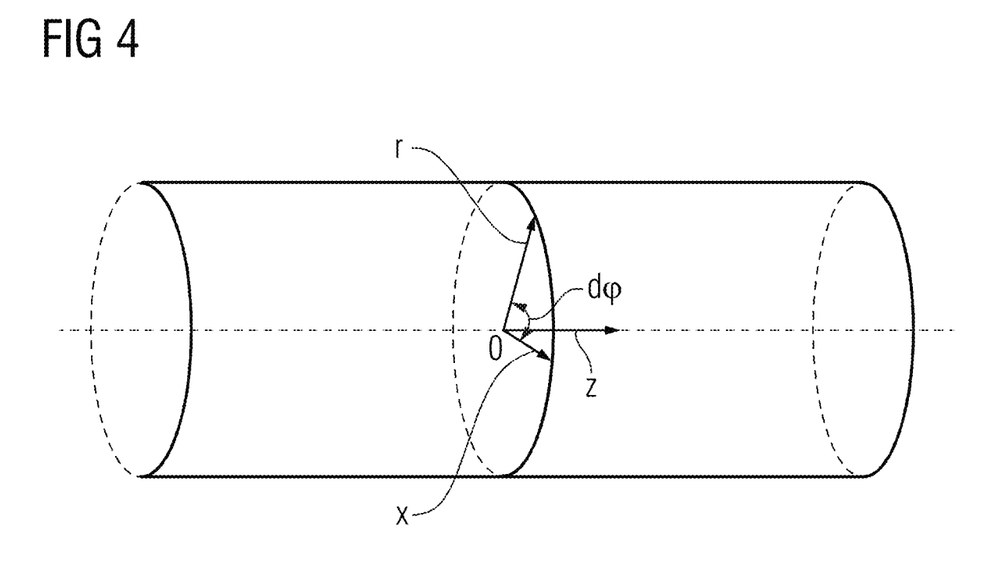
FIG. 4 shows a schematic illustration of a cylinder for explaining parameters.

FIG. 4 illustrates a schematic illustration of a cylinder for explaining parameters. The cylinder axis corresponds to the longitudinal direction z, in particular, the longitudinal direction z of the gradient coil unit 19. The circumferential direction can be characterized by dϕ. The direction perpendicular to the circumferential direction dϕ is labeled as the radial direction r. The direction labeled as x is typically oriented perpendicular to the longitudinal direction z and horizontally.

Although the disclosed aspects have been further illustrated and described in detail by the preferred exemplary aspects, the invention is not limited in this regard by the disclosed examples, and other variations can be derived therefrom by the person skilled in the art without departing the scope of the invention.

The invention claimed is:

1. A gradient coil unit surrounding a cylindrical patient receiving region, comprising:
    a hollow cylindrical primary coil; and
    a hollow cylindrical secondary coil that surrounds the primary coil and the patient receiving region in a coaxial manner,
    wherein the gradient coil unit has a first longitudinal end in a longitudinal direction, which is designed to receive an examination object, and a second longitudinal end that lies opposite the first longitudinal end in the longitudinal direction,
    wherein the primary coil has a first length in the longitudinal direction, which is delimited by a first longitudinal position that is facing the first longitudinal end, and a second longitudinal position that is facing the second longitudinal end,
    wherein the secondary coil has a second length in the longitudinal direction, which is delimited by a third longitudinal position that is facing the first longitudinal end, and a fourth longitudinal position that is facing the second longitudinal end,
    wherein the first longitudinal position has a greater spacing with respect to the first longitudinal end than the third longitudinal position,
    wherein the gradient coil unit is dividable into four quadrants,
    wherein the primary coil comprises four helical primary conductor structures that are arranged in each case within a quadrant surrounding a respective primary fix point,
    wherein the secondary coil comprises four helical secondary conductor structures that are arranged in each case within a quadrant surrounding a respective secondary fix point, and
    wherein a first section of the primary coil that is delimited in the longitudinal direction by the first longitudinal position and by a further primary longitudinal position at a spacing of between 10% and 25% of the first length with respect to the first longitudinal position, and is not provided with a connecting conductor that connects two primary conductor structures to one another and/or a primary conductor structure to a secondary conductor structure.

2. The gradient coil unit as claimed in claim 1, further comprising:
    a casing that at least in part encompasses the gradient coil unit and is designed as funnel-shaped on the first longitudinal end.

3. The gradient coil unit as claimed in claim 1,
    wherein the first longitudinal position and the third longitudinal position differ by at least 3 cm.

4. The gradient coil unit as claimed in claim 1,
    wherein the second longitudinal position and the fourth longitudinal position differ by at most 4 cm.

5. The gradient coil unit as claimed in claim 1, wherein the gradient coil unit has an inner diameter of at least 840 mm and a spatial extent in a longitudinal direction of at most 1350 mm.

6. The gradient coil unit as claimed in claim 1, wherein the primary conductor structures, which are arranged within a quadrant that overlaps with the first section, have in each case the highest density of electrical conductors within the first section.

7. The gradient coil unit as claimed in claim 1, further comprising:
a primary connecting conductor, which connects two primary conductor structures to one another and/or a primary conductor structure to a secondary conductor structure and which connects to a winding of the primary conductor structure, which is closest to the at least one primary fix point.

8. The gradient coil unit as claimed in claim 1, wherein a second section of the secondary coil is delimited in the longitudinal direction by the third longitudinal position and by a further secondary longitudinal position at a spacing of at most 25% of the second length with respect to the third longitudinal position, and is not provided with a secondary connecting conductor that connects two secondary conductor structures to one another and/or a primary conductor structure to a secondary conductor structure.

9. The gradient coil unit as claimed in claim 8, wherein the secondary conductor structures, which are arranged within a quadrant that overlaps with the second section, have in each case the highest density of electrical conductors within the second section.

10. The gradient coil unit as claimed in claim 1, further comprising:
a secondary connecting conductor, which connects two secondary conductor structures to one another and/or a primary conductor structure to a secondary conductor structure and which connects to a winding of the secondary conductor structure, which is closest to the at least one secondary fix point.

11. A magnetic resonance device, comprising:
a detector unit having a main magnet;
a radio frequency antenna unit;
a gradient coil unit according to claim 1, wherein the gradient coil unit surrounds the radio frequency antenna unit in a coaxial manner; and
a control unit that is designed to control the detector unit,
wherein a spatial extent of the radio frequency antenna unit in a longitudinal direction is shorter than the second length.

* * * * *